(12) United States Patent
Sneh

(10) Patent No.: US 9,909,682 B2
(45) Date of Patent: Mar. 6, 2018

(54) FLUID-ACTUATED FLOW CONTROL VALVES

(71) Applicant: Sundew Technologies, LLC, Broomfield, CO (US)

(72) Inventor: Ofer Sneh, Boulder, CO (US)

(73) Assignee: Sundew Technologies LLC, Broomfield, CO (US)

( * ) Notice: Subject to any disclaimer, the term of this patent is extended or adjusted under 35 U.S.C. 154(b) by 0 days.

(21) Appl. No.: 15/106,321

(22) PCT Filed: Dec. 26, 2014

(86) PCT No.: PCT/US2014/072444
§ 371 (c)(1),
(2) Date: Jun. 20, 2016

(87) PCT Pub. No.: WO2015/105700
PCT Pub. Date: Jul. 16, 2015

(65) Prior Publication Data
US 2016/0341330 A1    Nov. 24, 2016

Related U.S. Application Data

(60) Provisional application No. 61/924,249, filed on Jan. 7, 2014.

(51) Int. Cl.
*F16K 31/40* (2006.01)
*F16K 7/17* (2006.01)
(Continued)

(52) U.S. Cl.
CPC .............. *F16K 31/402* (2013.01); *F16K 7/16* (2013.01); *F16K 7/17* (2013.01); *F16K 31/128* (2013.01); *G05D 7/0113* (2013.01)

(58) Field of Classification Search
CPC ........ F16K 31/402; F16K 31/128; F16K 7/16; F16K 7/17; G05D 7/0113;
(Continued)

(56) References Cited

U.S. PATENT DOCUMENTS 2,407,761 A * 9/1946 McPherson ........... F16K 31/402
137/84
2,572,175 A * 10/1951 McPherson ........... F16K 31/402
251/30.05

(Continued)

FOREIGN PATENT DOCUMENTS

EP    0190414 A1    8/1986
GB    899236 A    6/1962

*Primary Examiner* — Mary McManmon
*Assistant Examiner* — Minh Le
(74) *Attorney, Agent, or Firm* — Law Offices of Michael L. Wise, LLC

(57) ABSTRACT

An apparatus is described for controlling a flow of a fluid therethrough while the apparatus is connected to a source of control fluid. The apparatus includes an input, a valve seat, a diaphragm, an output, and a diaphragm control space. The diaphragm control space is partially defined by the diaphragm, and includes a control fluid inlet and a control fluid outlet. The apparatus is operative to independently control a flow of control fluid into the diaphragm control space through the control fluid inlet and a flow of control fluid out of the diaphragm control space through the control fluid outlet. A deflection of the diaphragm in relation to the valve seat is responsive to a pressure of the control fluid in the diaphragm control space. The deflection of the diaphragm in relation to the valve seat is operative to control a fluidic flow resistance between the input and the output.

17 Claims, 10 Drawing Sheets

(51) Int. Cl.
  *F16K 31/128* (2006.01)
  *F16K 7/16* (2006.01)
  *G05D 7/01* (2006.01)

(58) Field of Classification Search
  CPC ..... Y10T 137/87209; Y10T 137/87185; Y10T 137/87193; Y10T 137/7768; Y10T 137/782; Y10T 137/86614; Y10T 137/86582; Y10T 137/5994; Y10T 137/7879
  USPC ............. 137/596.16, 489.5, 596.13, 596.14, 137/315.05; 251/12, 30.01, 331
  See application file for complete search history.

(56) References Cited

U.S. PATENT DOCUMENTS

| | | | | |
|---|---|---|---|---|
| 2,772,066 A * | 11/1956 | Keeton | | F16K 31/365 251/46 |
| 3,083,943 A | 4/1963 | Stewart, Jr. et al. | | |
| 3,844,529 A * | 10/1974 | Brandt, Jr. | | F16K 7/17 251/61.1 |
| 3,957,244 A * | 5/1976 | Chauvigne | | F16K 31/385 251/30.05 |
| 4,961,441 A * | 10/1990 | Salter | | G05D 16/2053 137/14 |
| 5,090,659 A | 2/1992 | Bronnert | | |
| 5,131,627 A * | 7/1992 | Kolenc | | F16K 41/12 251/331 |
| 5,326,078 A * | 7/1994 | Kimura | | F16K 7/16 251/331 |
| 5,427,350 A * | 6/1995 | Rinkewich | | A01G 25/16 137/625.22 |
| 5,447,173 A | 9/1995 | Kazama et al. | | |
| 5,496,009 A | 3/1996 | Farrell et al. | | |
| 5,551,664 A * | 9/1996 | Boke | | B67D 7/36 251/30.03 |
| 5,586,575 A * | 12/1996 | Bergamini | | F15B 13/0438 137/116.5 |
| 5,632,465 A * | 5/1997 | Cordua | | F16K 7/126 251/30.02 |
| 5,671,905 A * | 9/1997 | Hopkins, Jr. | | F03C 7/00 251/129.01 |
| 5,887,847 A * | 3/1999 | Holborow | | F16K 31/128 251/30.02 |
| 5,954,080 A * | 9/1999 | Leatherman | | F16K 31/402 137/14 |
| 6,095,484 A * | 8/2000 | Frenkel | | F16K 7/126 137/488 |
| 6,196,521 B1 | 3/2001 | Hynes et al. | | |
| 6,338,358 B1 * | 1/2002 | Watanabe | | G05D 16/2093 137/102 |
| 6,557,820 B2 * | 5/2003 | Wetzel | | F15C 5/00 137/596.16 |
| 6,568,416 B2 * | 5/2003 | Tucker | | G05D 16/2053 137/14 |
| 6,779,541 B2 * | 8/2004 | Inayama | | G05D 16/2093 137/102 |
| 6,830,229 B2 * | 12/2004 | Wetzel | | F15C 5/00 137/596.16 |
| 6,911,092 B2 | 6/2005 | Sneh | | |
| 7,552,906 B2 * | 6/2009 | Irwin | | F16K 7/126 251/331 |
| 7,744,060 B2 | 6/2010 | Sneh | | |
| 8,162,286 B2 | 4/2012 | Sawada et al. | | |
| 8,256,744 B2 * | 9/2012 | Tanikawa | | F16J 3/02 251/331 |
| 9,125,721 B2 * | 9/2015 | Field | | A61F 9/00781 |
| 2003/0155541 A1 * | 8/2003 | Sheydayi | | F16K 7/17 251/61 |
| 2009/0272922 A1 | 11/2009 | Bosko | | |

* cited by examiner

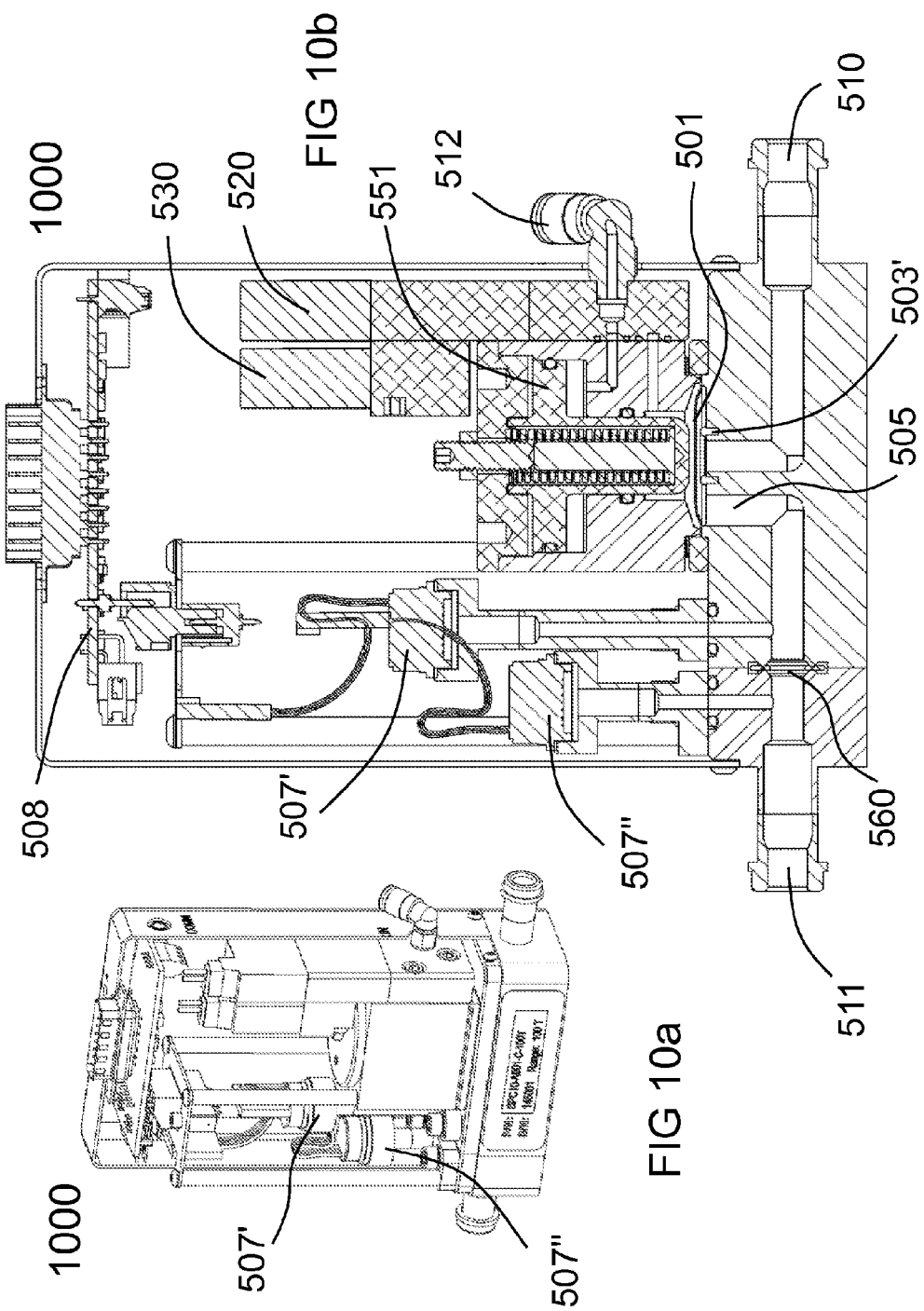

FLUID-ACTUATED FLOW CONTROL VALVES

FIELD OF THE INVENTION

This invention relates to the field of fluid delivery and, more specifically, to apparatus and methods for the flow-controlled delivery of gases and liquids.

BACKGROUND OF THE INVENTION

Fluids (i.e., gases and liquids) are used in many manufacturing industries. Within a manufacturing process, fluids are typically dispensed with precision of flow rate, timing or both. Generally, fluid dispensing equipment has the ability to adjust the flow rate by means of flow control valves. A flow control valve regulates the opening of a flow path (i.e., an orifice) to suit the necessary flow rate.

In addition to the orifice, the flow rate also depends on the properties of the fluid, as well as its temperature and pressure. For a given fluid at steady temperature and pressure, stable flow rates may be determined simply by the setting of the flow control valve. However, in many practical flow control systems, the combination of temperature and pressure instability, as well as the finite precision and accuracy of the flow control valve, may prohibit the attainment of adequately stable and/or repeatable flow rate. In addition, downstream from the flow control valve, a plurality of valves, sensors and other elements may also impact flow rate stability. In such instances, a flow control valve may incorporate a flow sensor and a tunable flow control valve to pursue the desired flow rate. For that purpose, the flow control system drives the tunable flow control valve to adjust the actual flow rates, to be equal to the desired flow rate. This self-correcting fluid delivery method has been successfully adapted for automatic manufacturing in many different industries.

Conventional flow control valves implement a variety of variable-orifice designs. Commonly, the orifice is confined between two surfaces. One of the surfaces comprises a fluid flow inlet, commonly known as a "valve seat." A second surface is mechanically actuated to vary the gap between these surfaces and adjust the orifice. The second surface is often attached to a precision controlled mechanical actuator such as a precision screw, a proportionally controlled solenoid or a proportionally controlled piezoelectric actuator. Typically, the impact of the gap on the flow rate is strongly nonlinear, especially for small gaps. Given the nonlinearity, as well as limitations of mechanical stability and precision, most manually driven, precision screw-based valves resort to designs that increase the surface area of the gap. This increased area provides sufficient flow resistance at somewhat larger gaps to reduce the impact of nonlinearity and the effects of mechanical imperfections and screw backlash, thereby improving flow control.

One popular design, for example, implements a motion controlled tapered needle and a matching cavity. This "needle valve" design enables reasonably stable and repeatable manually controlled valves that are capable of reliable flow control down to about 2% of the maximum flow, wherein maximum flow means the flow of a fully open valve. However, highest performing "metering needle valves" are prone to significant wear of the needle over the needle cavity. This wear is especially pronounced when controlling the small gaps that provide flow rates lower than 5% of the maximum flow. Such wear results in both reduced valve performance and the generation of particles. Particles that are generated in the flow control system and consequentially delivered into the process via streams of fluids are detrimental to the quality of many industrial manufacturing applications and are therefore undesirable. Accordingly, needle valves are mainly implemented for applications that do not require frequent flow adjustment and are not very sensitive to particulates. Moreover, they are best used when not pushed to control flow rates below about 5% of their total range.

The precision of a manual flow control valve is adversely impacted by temperature and pressure instabilities as well as potentially fluctuating impact of downstream components. Therefore, they have growingly become inadequate for precision manufacturing. Instead, flow control valves (also known as Mass Flow control valves—MFCs) can actively and controllably adjust the orifice gap to yield desired flow rates regardless of mechanical precision and stability limitations. Likewise, they can correct for temperature and pressure fluctuations or the impact of downstream components. They are also fully compatible with factory automation and quality control systems, hence, their growing widespread popularity. Within MFCs, flow control valves with gap controlling actuators adjust the orifice between a fixed plane and the moving end of the actuator, wherein a fluid entry port, commonly called a "valve seat," is defined on the fixed plane. Hence, the actuator is immersed in the fluid with potential fluid contamination, actuator corrosion, jamming and particle generation. To address this issue, some designs provide a metallic diaphragm disposed between the actuator and the valve seat, in compatibility with Ultra High Purity (UHP) standards. For example U.S. Pat. No. 8,162,286 to Sawada et al. and entitled "Piezoelectric Driven Control Valve" discloses a flow control valve with a piezoelectric actuator and a UHP design. Likewise, U.S. Pat. No. 5,447,173 to Kazama et al. and entitled "Mass Flow Controller, Operating Method and Electromagnetic Valve" discloses a flow control valve with a solenoid actuator and UHP design.

FIG. 1 depicts a UHP-compliant flow control valve 100. A dome-shaped metallic diaphragm 101 creates an all-metallic valve chamber 102 over valve seat 103. Valve seat 103 is located substantially across from the concave center of diaphragm 101. The orifice 104 is defined between valve seat 103 and diaphragm 101. Within valve chamber 102, a fluid outlet port 105 is also formed. Diaphragm 101 seals the fluid within valve chamber 102 to prevent fluid-actuator contact. The gap between diaphragm 101 and valve seat 103 is reduced when actuator 106 deforms diaphragm 101 towards valve seat 103. Similarly, the gap is increased when a retreat of actuator 106 allows diaphragm 101 to spring back away from valve seat 103. Also indicated in FIG. 1 are flow sensor 107, controller 108, enclosure 109, inlet fitting 110 and outlet fitting 111.

Typically, conventional actuators are electrically driven in one direction and mechanically returned in the other direction by a spring in the case of solenoids, or by strain discharge in the case of piezoelectric actuators. Generally, well designed actuators can provide nearly linear position change per electrical drive (current for solenoids and voltage for piezoelectric actuators). As a result, linearly responding actuators may tune the orifice gap linearly. Nevertheless, linear gap tuning produces nonlinear flow change. Ideally, actuators should be able to correct a difference between actual flow rate and the desired (set point) flow rate instantaneously and accurately. Likewise, they should also be able to respond to a set point change with speed and precision.

Automated flow control valves typically apply closed-loop, proportional-integral (PI) or proportional-integral-derivative (PID) algorithms to alter the gap and adjust the flow to match the set point. However, both PI or PID control algorithms, as well as other control algorithms known in the art, are not suitable for accurate and responsive control of nonlinear systems. Particularly, nonlinearity makes flow control parameters flow dependent. That means that, for a given set of flow control parameters (i.e., particular PI or PID constants), controllers cannot accurately control the actual flow to match a set point beyond the single flow rate that was selected to initially tune the system and extract the PI or PID constants. Using these same flow control parameters to control other flow rates often yields erroneous and sometimes oscillatory flow rates, as well as substantially slower response. Likewise, erroneous and oscillatory flow rates may also be driven by temperature and inlet pressure change, drift, or other fluctuations. Similarly, many applications require the mixing of several flow-controlled sources of different fluids. Some systems also manipulate the mixing ratio during the process. Lastly, many mixing manifolds increase the pressure downstream from flow control valves. This increased downstream pressure acts to reduce the flow per given orifice, causing flow control valves to react to increase the orifice and match the actual flow to the set point. However, that reaction repositions the entire flow dependent PI or PID parameters. Due to nonlinearity, the shifts in the flow to gap dependence detunes the control system into lower performance, which results in sluggish response, increased error and tendency for oscillations. To overcome this problem, the flow control valves should ideally be tuned at the mixing condition. This tuning has to be repeated iteratively to converge all flow control valves into accurate and non-oscillatory control. If the process requires mixing ratio changes, new control constants are preferably deduced for all flow control valves and applied as part of the change. Even so, however, the mixing ratio is nevertheless undefined and unstable during transitions between different settings.

These fundamental deficiencies may be partially addressed by invoking actuator and orifice designs with reduced nonlinearity and controllers that apply microprocessors for flow versus actuator motion corrections ("gain scheduling") as part of the closed-loop control. Likewise, implementing temperature compensation and integrating inlet pressure control may tame the adverse impact of fluctuating or drifting temperature and/or inlet pressure. In some cases, when controlling fluids with relatively high inlet pressures, a highly restrictive outlet orifice may effectively suppress the destabilizing impact of downstream components and/or other flows in the system. It is also recognized that flow control valves perform best when the size of the orifice is optimized to the application given the flow range, the type of fluid, the temperature and the entire process system. Given these improvements, sophisticated modern flow control valves may operate adequately over a range of flow rates around 10-90% of maximum flow for a wide range of applications. At the same time, these modern flow control valves can mitigate the slow and oscillatory response at both the low and the high 20-30% ends of the range, as well as erroneous transient performance at flow rates that are outside a very narrow range of the most optimized flow rate. In addition, in order to cover a wider range, systems may use multiple different flow control valves with different ranges. That said, range limitations still create the need for many different and distinctive models of flow control valves, and thereby substantially increase inventory size and cost for manufacturers.

Flow control valves are also applied to control the pressure within delivery manifolds wherein the flow sensor is substituted for a pressure sensor and the flow control device is tasked with tuning the actual pressure to a set point pressure. These pressure controllers find usage in a variety of applications, such as fluid delivery into Atomic Layer Deposition (ALD) systems. In these particular applications, the pressure controllers allow pressure-controlled gas to be made available at the inlets of fluid delivery valves that drive the ALD processing. Such fluid delivery valves for ALD are discussed in, for example, U.S. Pat. No. 7,744,060 to Sneh and entitled "Fail-safe Pneumatically Actuated Valve with Fast Time Response and Adjustable Conductance," which is hereby incorporated by reference herein. When a fluid delivery valve is opened, precisely metered delivery is established with a flow rate that is determined by the controlled inlet pressure and the conductance of the ALD valve. That delivery is shaped as a pulse. Accordingly, the flow control valve of the pressure controller must accurately respond to the pulse by quick flow rate changes, essentially going between a zero flow rate when pressure is at the pressure set point and a flow rate sufficiently high to restore the pressure back to the set point during and just after a pulse. The precision of this pressure control is vital for efficient usage of reactive gas, as well as to the implementation of Synchronously Modulated Flow and Draw (SMFD) ALD, which is discussed in U.S. Pat. No. 6,911,092 to Sneh and entitled "ALD Apparatus and Method," which is also hereby incorporated by reference herein. SMFD ALD implements fast ALD processes with <500 millisecond (ms) cycle times and recovery times between successive pulses trending to below 150 ms. Conventional pressure controllers struggle with such demanding applications.

One other challenging application implements flow control valves as pressure controllers to control the pressure of inert gas that is used to provide improved thermal contact to process heaters and improve their isolation from process effluents. In particular, fragile heaters may be disposed inside a heating chuck wherein heater to chuck contact and/or complete sealing of the heaters inside the chuck is not possible. Accordingly, helium gas (He) is applied to assist in heat transfer and provide positive flow out of the chuck space to negate the penetration of harsh process chemicals. Ideally, helium pressure inside the chuck should be kept at the same value during idle, process and transitions between idle and process so as to promote stable chuck temperature. A typical sequence of idle, part-handling, idle, transition, process, transition challenges the pressure controller to adapt quickly to a sequence of flow-1, no-flow, flow-1, transition to flow-2, flow-2, transition to flow-1, wherein flow-2 is smaller than flow-1 given the impact of the process pressure. During part transfer, a shutoff valve is typically turned off, dropping the flow of helium to zero. It is the objective of the flow control valves to quickly react to these varying conditions so as to maintain the pressure at set value during the entire cycle while enduring the impact of significant flow rate changes. Conventional flow control valves struggle with this application.

In a similar application, inert gas is directed to prevent process fluid from reaching the backside of a wafer. In this application, inert gas is applied into the gap between a chuck and the backside of the wafer. A first pressure sensor is applied to obtain the pressure in the process chamber. A second pressure sensor is applied to obtain the pressure at the inert gas delivery line. In this case, the flow control valve is tasked with controlling the pressure differential between the second and the first pressure sensors to a given pressure differential set point, and to ensure that, independent of process pressure variability by design or due to imperfection, there is always a set point pressure differential to negate the flow of process chemicals into the gap. Here too, conventional flow control valves struggle with such a demanding application.

In some other common applications, precision controlled motion of pneumatic or hydraulic actuators is used to propel parts handling, robotic motion, stamping, etc. In these applications, flow-controlled fluids (e.g., air or hydraulic fluids) determine the speed of these motions. Often the speed of robotic arms and parts handling has to follow intricate and complex profiles with well-defined acceleration and deceleration profiles. In addition, some of these motions have to be able to perform their tasks under different or time-variable load conditions. To accommodate these requirements, flow control valves with adequate precision and fast response across wide ranges of flow rates and with the ability to accommodate a wide range of loads are needed. Existing systems struggle with many of these applications, in particular, when speed is of the essence.

Conventional flow control valves may also struggle to provide reliable operation at high temperatures, to provide reliable low and zero flow performance, and to provide mechanisms for fail safety, that is, mechanisms to automatically shut off when unexpected system conditions are encountered. With few exceptions, conventional flow control valves do not provide UHP construction with proper resistance to fluid contamination, valve corrosion, particle generation and jamming. These flow control valves with actuators immersed in the fluids are not suitable to control the flow of most liquids. Most flow control valves comprise a very small orifice as part of the means to be able to control relatively low flow rates from relatively high inlet pressures. These permanent flow restrictors adversely slowed down the rate of purging and decontaminating flow and pressure controllers and their manifolds prior to component replacement and/or the performance of maintenance.

In recent decades, many manufacturing processes have strived to improve efficiency, increase quality and reduce cost and waste. This trend growingly emphasizes reliable and precise automation as well as the ability to use manufacturing equipment as much as possible over a wide range of different processes. Within that trend, flow and pressure controllers with improved speed and precision over a wide range of flow rate, inlet pressure and ambient conditions, are essential for optimal, low waste and repeatable processing.

For the foregoing reasons, there is a need for new designs for flow control valves that address the above-identified deficiencies.

SUMMARY OF THE INVENTION

Embodiments in accordance with aspects of the invention provide apparatus and methods that address the above-identified needs.

Aspects of the invention are directed to an apparatus for controlling a flow of a fluid therethrough while the apparatus is connected to a source of control fluid. The apparatus comprises an input, a valve seat, a diaphragm, an output, and a diaphragm control space. The diaphragm control space is partially defined by the diaphragm, and comprises a control fluid inlet and a control fluid outlet. The apparatus is operative to independently control a flow of control fluid into the diaphragm control space through the control fluid inlet and a flow of control fluid out of the diaphragm control space through the control fluid outlet. Moreover, a deflection of the diaphragm in relation to the valve seat is responsive to a pressure of the control fluid in the diaphragm control space. Lastly, the deflection of the diaphragm in relation to the valve seat is operative to control a fluidic flow resistance between the input and the output.

Additional aspects of the invention are directed to a method for controlling a flow of a fluid. The method comprises providing an input, a valve seat, a diaphragm, an output, and a diaphragm control space. The diaphragm control space is partially defined by the diaphragm, and comprises a control fluid inlet and a control fluid outlet. Moreover, the method further comprises the step of independently controlling a flow of control fluid into the diaphragm control space through the control fluid inlet and a flow of control fluid out of the diaphragm control space through the control fluid outlet. A deflection of the diaphragm in relation to the valve seat is responsive to a pressure of the control fluid in the diaphragm control space. Lastly, the deflection of the diaphragm in relation to the valve seat is operative to control a fluidic flow resistance between the input and the output.

The above-identified embodiments may provide several advantages. More particularly, flow control valves in accordance with aspects of the invention may, as just a few examples:
provide for both manual and automated flow and pressure control;
control both gas and liquid fluids;
perform reliably over wide ranges of flow, inlet pressure, and temperature conditions;
provide, fast and accurate response to flow or pressure set point changes, as well as fast and accurate response to changes in process-driven downstream pressure, temperature and inlet-pressure;
provide a failsafe response with true shutoff when undesired system conditions are encountered;
not require permanent flow restrictors, allowing for quick and efficient decontamination;
implement UHP construction, and thereby be suitable for operation with a wide selection of fluids, including corrosive and reactive fluids as well as liquids that contain dissolved solids, colloidal solutions, oils and fuels;
operate such that they avoid particle generation; and
provide flow and pressure control over substantially the entire range of flow and pressure control applications.

BRIEF DESCRIPTION OF THE DRAWINGS

These and other features, aspects, and advantages of the present invention will become better understood with regard to the following description, appended claims, and accompanying drawings where:

FIG. 10a shows a perspective view of a flow control valve including an integrated high speed flow measurement sensor, in accordance with an illustrative embodiment of the invention; and FIG. 10b shows a sectional view of the FIG. 10a flow control valve.

DETAILED DESCRIPTION OF THE INVENTION

Figure 2:
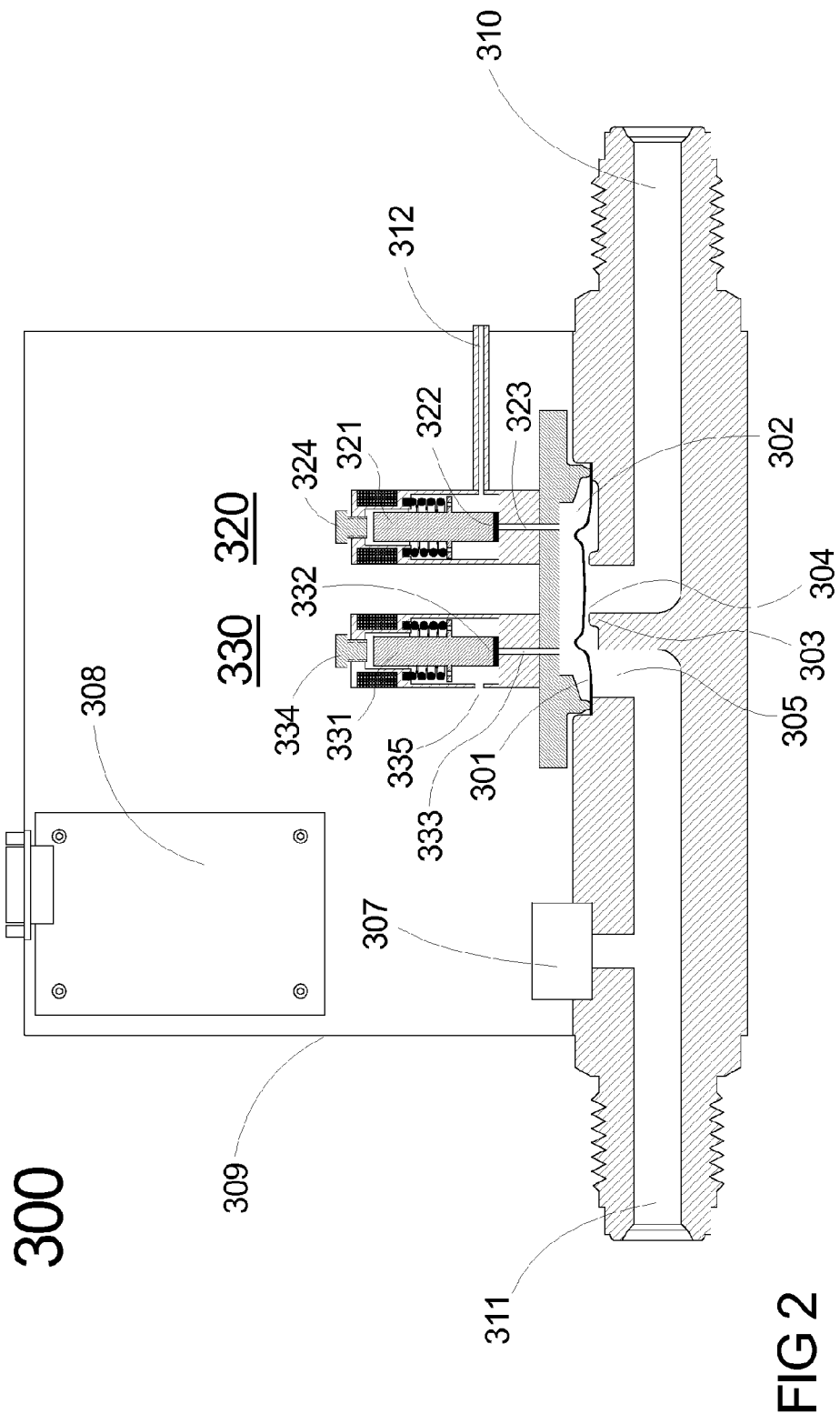
FIG. 2 shows a sectional view of a flow control valve in accordance with a first illustrative embodiment of the invention.

While conventional flow and pressure control valves utilize mechanical means for deflecting a diaphragm in relation to a valve seat to affect orifice geometry, aspects of the invention instead utilize the pressure of a control fluid on a diaphragm to produce a similar effect. FIG. 2 shows a sectional view of a flow control valve 300 in accordance with a first illustrative embodiment of the invention. The flow control valve 300 comprises a metallic diaphragm 301 disposed so as to seal the flow path between valve seat 303 and fluid outlet port 305. Orifice 304 is thereby formed between diaphragm 301 and valve seat 303. A sealed diaphragm control space 302 is formed above diaphragm 301 and is partly defined by the diaphragm 301. The diaphragm control space 302 comprises control fluid inlet 323 and control fluid outlet 333. The flow control valve 300 also includes a flow or pressure sensor 307, inlet fitting 310, outlet fitting 311, control fluid inlet 312, solenoid valve 320, solenoid valve 330, controller 308 and enclosure 309. Control fluid (e.g., compressed air) from control fluid inlet 312 is fed into solenoid 320.

In operation, solenoids 320, 330 cooperate to modulate the pressure of control fluid inside the sealed diaphragm control space 302, and thereby control the amount of deflection of the diaphragm 301. More particularly, when solenoid 320 is activated, normally-closed plunger 321 pulls seal 322 upward to open a flow path through inlet 323 and raise the pressure inside diaphragm control space 302. This tends to deflect diaphragm 301 towards valve seat 303 and reduce orifice 304. Flow rate through the flow control valve 300 is thereby lowered. Conversely, when solenoid 330 is activated, normally-closed plunger 331 pulls seal 332 upward to open a flow path through outlet 333 and lower the pressure inside diaphragm control space 302 by allowing control fluid to flow out of vent port 335. Diaphragm 301 responds to the reduced pressure by deflecting away from valve seat 303 to increase orifice 304 and increase the flow rate. Preferably, the diaphragm 304 is shaped to yield a nonlinear spring constant. This nonlinear response is designed to yield an advantageous relation between flow rate and the pressure of the control fluid in diaphragm control space 302. For example, in one or more non-limiting embodiments, the nonlinear response may produce a linear relation over a wide range of flow rates higher than 200 standard cubic centimeters per minute (sccm), converging into a progressively weakening dependence in the lower 0-200 sccm range.

Figure 3:
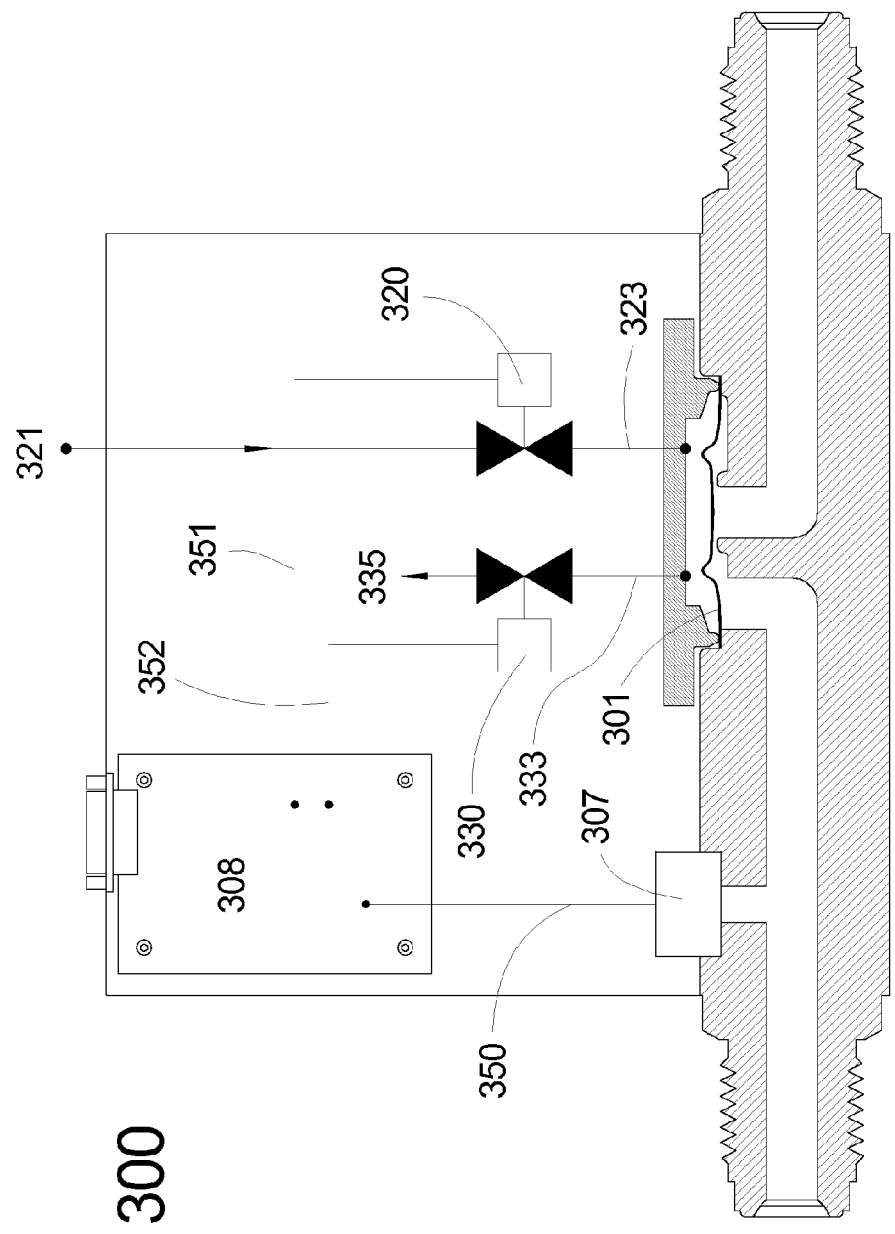
FIG. 3 shows a sectional view of the FIG. 2 flow control valve with its solenoid valves depicted schematically.

FIG. 3 illustrates flow control valve 300 with solenoid valves 320, 330 depicted with schematic symbols. Sensor reading cable 350, and solenoid actuation cables 351 and 352 are also illustrated schematically. The cables 350, 351, 352 interface sensor 307 with controller 308, and controller 308 with solenoids 320, 330.

The flow control valve 300 may function to control flow rate or pressure. More particularly, flow control valve 300 is configured to control flow rates when sensor 307 is acting as a flow sensor, while flow control valve 300 is configured to control pressure when sensor 307 is acting as a pressure sensor. The actual flow (or pressure) signal is read by controller 308 and compared with a set point value. The error between reading and set point is then applied to adjust the pressure of the control fluid inside diaphragm control space 302 via solenoids 320, 330. When the error is positive (set point exceeds the actual reading), solenoid 330 is actuated to decrease the control fluid pressure in diaphragm control space 302 and increase orifice 304. Conversely, when the error is negative, solenoid 320 is actuated to increase control fluid pressure to reduce orifice 304. Once the flow rate (or pressure) is controlled to match the set point, the control fluid pressure is essentially latched inside diaphragm control space 302. Tests of prototypes similar to the flow control valve 300 have shown that, at steady inlet pressure and ambient temperature, the flow rate (or pressure) can be held steady under such latched conditions (i.e., without actuation of the solenoids) at better than ±0.2% for several hours. Accordingly, the flow control valve of the current invention is an "integrating system." Therefore, the control algorithm does not require an integral term.

The controller 308 may comprise one or more microprocessors with associated memory, which are collectively operative to signal the solenoids 320, 330 at least in part in response to flow or pressure signals received from flow or pressure sensor 307. In one or more embodiments, the controller 308 may, for example, actuate solenoids 320, 330 via a proportional-derivative (PD) determined duty cycle. More particularly, the solenoids 320, 330 may be actuated at a user-selectable frequency with the fraction of "ON" versus "OFF" being a function of the error via the PD parameters. In alternative embodiments, the controller 308 may actuate proportionally controlled solenoids 320, 330 proportionally by a PD-determined current. The controller 308 may apply the same PD parameters to the control of both solenoids 320, 330. However, in some cases, the controller 308 may also apply different PD parameters to controlling each solenoid 320, 330 for optimum performance. Given the teachings herein, both P-based and PD-based control schemes, as well as other equally suitable control methods also falling within the scope of the invention, will already be familiar to one having ordinary skill in the relevant arts. Reference is also made to J-P Corriou, *Process Control: Theory and Applications*, Springer 2004; and C. Smith, *Practical Process Control: Tuning and Troubleshooting*, John Wiley & Sons, 2009, which are both hereby incorporated by reference herein.

Figure 4:
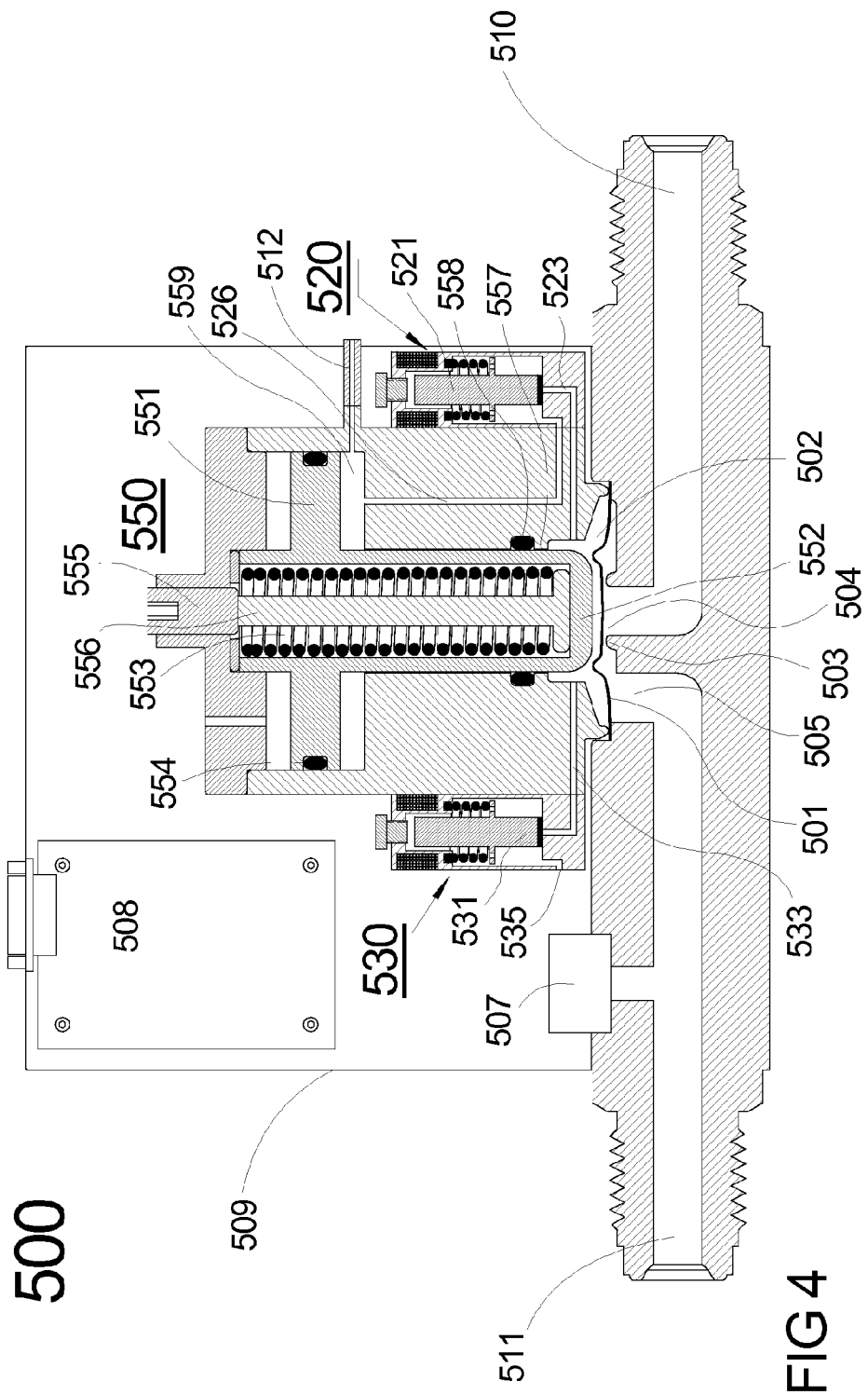
FIG. 4 shows a sectional view of a flow control valve in accordance with a second illustrative embodiment of the invention.

FIG. 4 shows a sectional view of a flow control valve 500 in accordance with a second illustrative embodiment of the invention. Flow control valve 500 differs from flow control valve 300 in that flow control valve 500 comprises a failsafe metal sealed shutoff valve. In a manner similar to flow control valve 300, however, flow control valve 500 may be used to control flow rates when sensor 507 is a flow sensor, or used to control pressure when sensor 507 is a pressure sensor.

Within flow control valve 500, metallic diaphragm 501 is positioned such that it is operative to seal the flow path between valve seat 503 and fluid outlet port 505. Orifice 504 is formed between diaphragm 501 and valve seat 503. A sealed diaphragm control space 502 is formed above diaphragm 501. The diaphragm control space comprises control fluid inlet 523 and control fluid outlet 533. The flow control valve 500 also includes inlet fitting 510, outlet fitting 511, control fluid inlet 526, solenoid valve 520, solenoid valve 530, controller 508 and enclosure 509. Fluid from inlet 526 (e.g., compressed air) is fed into solenoid 520. When solenoid 520 is activated, plunger 521 opens a flow path through inlet 523 to raise the pressure inside diaphragm control space 502 and deflect diaphragm 501 towards valve seat 503 to reduce orifice 504. Flow rate is thereby reduced. Conversely, when solenoid 530 is activated, normally closed plunger 531 opens a flow path through outlet 533 and lowers the pressure inside diaphragm control space 502 by allowing control fluid to flow out of vent port 535. Diaphragm 501 responds to the reduced pressure by deflecting away from valve seat 503 to increase orifice 504 and increase the flow rate.

Flow control valve 500 comprises shutoff valve 550 to provide failsafe shutoff of diaphragm 501 via stem 552 when, for example, the pressure of control fluid is lost due to a system failure. Stem 552 can slide into control space 502 via opening 557. At the same time, seal 558 maintains the overall fluid tightness of control space 502. Stem 552 is retained to shutoff valve 550 by the force of spring 553, which is adapted to bias the stem 552 towards the diaphragm 501. The shutoff valve 550 is actuated open when pressurized control fluid (e.g., compressed air) is injected into actuator space 559 so as to translate the piston 551 against the spring 553 and away from the diaphragm 501. Piston 551 is equipped with sliding seal 554. Once shutoff valve 550 is actuated open, control fluid from actuator space 559 feeds into solenoid 520 via inlet 526, where it is available to modulate the position of diaphragm 501. Preferably, in use, the retraction of stem 552 is adjusted to the minimum needed to allow diaphragm 501 a full range of motion by plunger 556, as set by adjustment screw 555. That limited motion is desirable for minimizing the acceleration of stem 552 when control fluid pressure is lost, and the consequent impact when stem 552 translates into diaphragm 501 over valve seat 503. This impact is further reduced by restricting the vent of air out of actuator space 559 when the air supply at inlet 512 is deactivated. In actual reduction to practice, both measures were found to be very effective in preventing the generation of particles by the failsafe shutoff valve 550.

Figure 5:
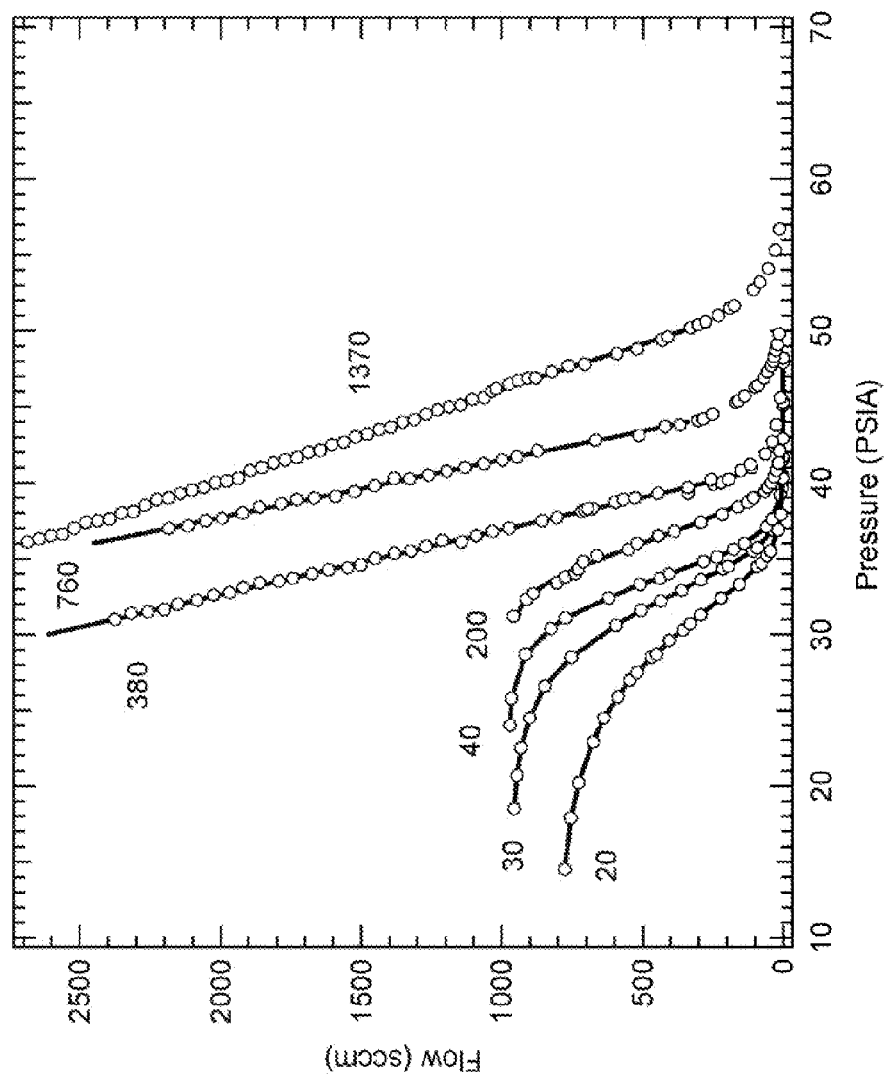
FIG. 5 displays a graph of flow rate versus control fluid pressure for a prototype flow control valve similar to that shown in FIG. 4.

A prototype flow control valve similar in design to that shown in FIG. 4 was utilized to determine the dependence of flow rate through the prototype flow control valve (labeled as "Flow" in sccm) on control fluid pressure (labeled as "Pressure" in pounds per square inch absolute (PSIA)) inside the prototype flow control valve and pressing down on the prototype's diaphragm. FIG. 5 displays these dependencies at different nitrogen gas inlet pressures, namely, 20, 30, 40, 200, 380, 760 and 1,370 Torr. The data was taken at room temperature to control the flow of nitrogen gas using compressed air as the control fluid. It will be noted that all traces exhibit a region with a substantially linear dependence of flow on pressure at flows higher than about 200 sccm. At low inlet pressure (about 20-200 Torr), the traces eventually start to level off and converge into the maximum flow rate bound by the finite conductance of the fully-open flow control valve and the test system (in this particular case, between 800-1,000 sccm). This conductance is quite high for such low inlet pressures given that the prototype flow control valve does not include a permanent flow restriction. At higher inlet pressures such as 380, 760 and 1,370 Torr, the linear region extended for the entire measurement, and the impact of conductance was negligible.

For most wide-range performance, PD parameters are preferably tuned within the linear part of flow rate versus control pressure, for example, at higher than 200 sccm for inlet pressures higher than 300 Torr in the example of FIG. 5. These parameters will not deteriorate the precision in the flow rate range below 200 sccm since, in contrast to conventional flow control valves, flow rate dependence on the control fluid pressure will moderate (i.e., become less sensitive to pressure). However, in that low flow range, the PD parameters derived in the linear range will result in reduced response times, while, at the same time, maintaining the precision beyond that needed. Optionally, an improvement may be made in that case with relatively simple "gain scheduling," as would be known to one having ordinary skill in the art. For example, the PD parameters may be extracted for several flow rates and used to fit a simple parameter versus flow rate formula. Then the actual flow rate will be used to continuously deduce the PD parameters and related solenoid duty cycle (or current).

The progressively weakening dependence at the 0-200 sccm range increasingly improves the finesse at lower set points. This feature is exactly the opposite of conventional behavior, wherein the nonlinearity means progressively worsening finesse at lower set points. Beyond a few hundred sccm (about 200 sccm in the example of FIG. 5), the linear dependence provides wide control range with more than adequate finesse. Moreover, if desired, the slope of both linear and weakening dependences may be easily controlled by the stiffness of the diaphragm through its thickness, mechanical properties and shape. One or more alternative embodiments may also utilize multiple diaphragms that are stacked between the flow-path and the diaphragm control space. Accordingly, flow control valves in accordance with aspects of the invention are able to control flow rates over 3-4 orders of magnitude and accommodate a 5-3,000 Torr inlet pressure range with up to 200° C. continuous operation temperature. Moreover, these flow control valves are easily purged at high flow for quick and efficient decontamination of upstream and downstream manifolds.

Above 300 Torr, the impact of the inlet pressure on the PD parameters may also be compensated for by reducing the proportional constant by about 40%. At the same time, the impact of ambient temperature up to 200° C. was found to be negligible. In other words, the prototype flow control valve was able to correct for inlet pressure and/or temperature fluctuations. In applications wherein significant inlet pressure fluctuations, drifts or variability are expected, it is preferred to reduce the proportional constant by up to 35% to ensure that under worst case conditions, the precision and stability of the flow rates are not compromised. In some cases this modification will result in up to 35% slower response. Nevertheless, with the exception of few applications and systems wherein fast and substantial fluctuations of inlet pressures, and/or fast and substantial variations in mixing ratios are common, the impact of the derivative constants are marginal and the algorithm can be simplified to apply proportional control only.

As further presented in FIG. 5, at low inlet pressure, the flow rate may be subjected to the limitations of fully open valve conductance. Accordingly, the impact of control fluid pressure slows down substantially in the high flow rate range. However, the prototype flow control valve was still able to control the flow up to the highest possible flow rate with precision. That is, applying the PD parameters from the linear portion of the flow versus control pressure dependence resulted in precise control. However, response time slowed down with the increase in flow rate. For example at 20 Torr inlet pressure, the pure response time of the prototype flow control valve was 20 ms after a set point increase by 200 sccm from 150 to 350 sccm, but required 80 ms for a set point increase by 200 sccm from 500 to 700 sccm. For most applications, this slower response time is still adequate and typically faster than the response time of the sensor, the manifold, or their combination.

Figure 1:
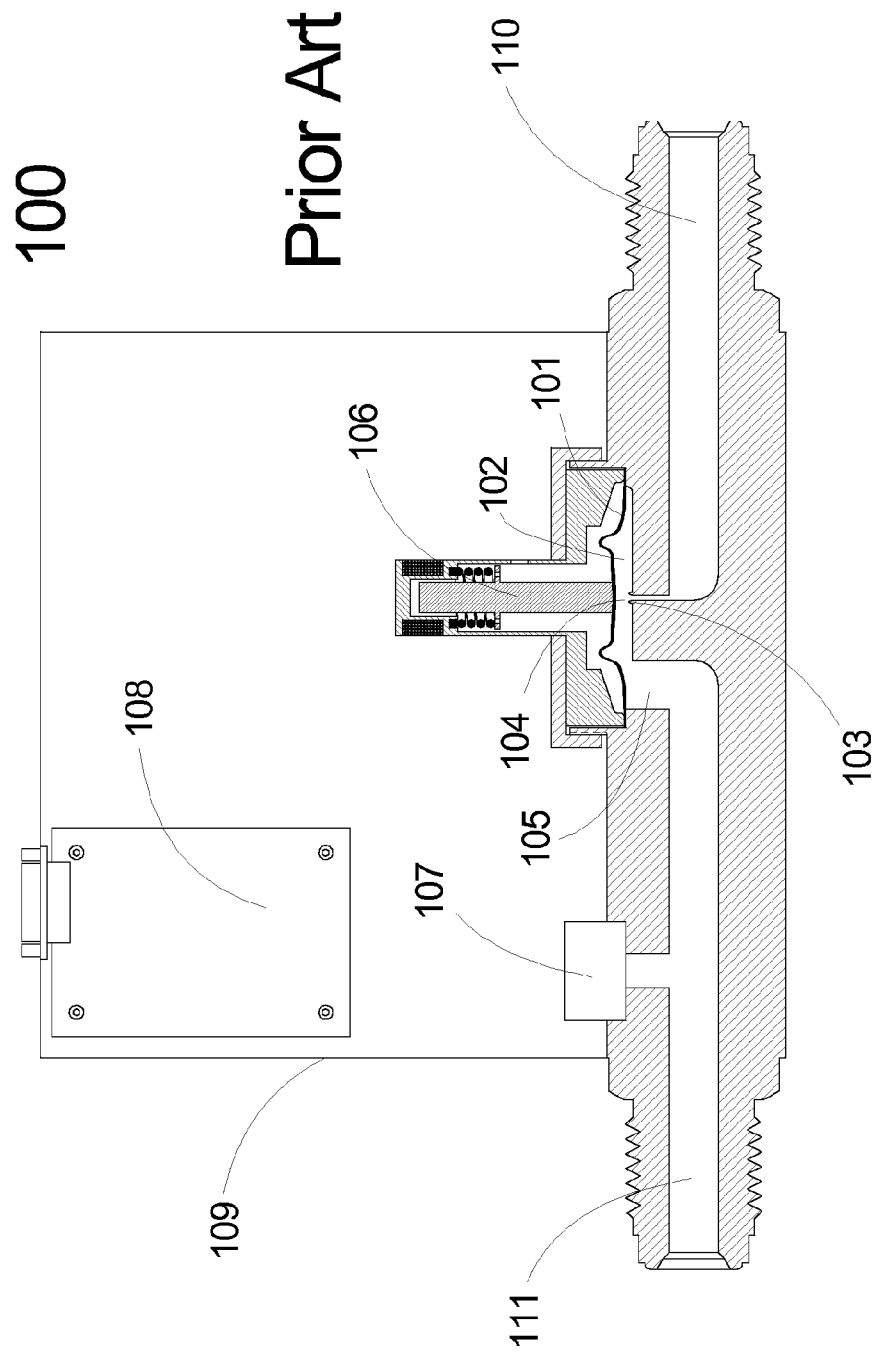
FIG. 1 depicts a sectional view of a prior art flow control valve.

U.S. Pat. No. 7,744,060 to Sneh and entitled "Fail-Safe Pneumatically Actuated Valve with Fast Time Response and Adjustable Conductance" (hereby incorporated by reference herein) describes a failsafe normally-closed (FSNC) pneumatic valve wherein a diaphragm is deflected in response to the application of control fluid pressure thereon. In that valve, the timing of diaphragm deflection and the transport of air into and out of a diaphragm control space above the diaphragm was typically less that 0.1 ms. (See, e.g., FIG. 1d of the '060 patent). This fast response time suggests that diaphragms like those discussed herein will respond practically instantaneously to changes in control fluid pressure. Therefore, the response of the flow control valves in accordance with embodiments of the invention is likely to be determined by the speed and the conductance of the solenoids, as well as the supply, controlling and vent pressures. Custom manufactured solenoids may have an ON/OFF response time of <0.5 ms. Moreover, the ON/OFF actuation time may be adjusted via gap controlling screws (like screws 324 and 334 in FIG. 2), with higher speeds resulting in a conductance tradeoff. For example, 0.4 ms solenoid response times in the solenoids of the prototype flow control valve corresponded to a flow of about 10 standard liters per minute (sLm) therethrough with a 45 PSIA control fluid inlet pressure feeding the solenoid. At that flow rate, a pressure change of 5 PSIA within a ~1 milliliter volume diaphragm control space takes about 2 ms. This pressure change will correspond, for example, to a flow rate change in the 200-2,500 sccm range for inlet pressures in the 300-3,000 Torr range (FIG. 5). Off-the-shelf, high-speed solenoid valves have response times in the of 1-3 ms range and support flow rates of up to about 50 sLm at 45 PSIA. These characteristics result in a 5 PSIA controlling pressure change in a diaphragm control space in the range of 1.5-4 ms. Proportional control, custom or off-the-shelf solenoid valves can typically vary the flow at 45 PSIA in the range of 0-5 sLm wherein a 5 PSIA change of pressure within a diaphragm control space can be as fast as 4 ms. These fundamentally fast response times enable well-tuned PD control with 20-50 ms response time over a wide range of flow rates, inlet pressures and temperatures.

Response times of high quality flow sensors typically vary between 2-500 ms. Response times of high quality pressure sensors typically vary between 0.1-20 ms. In some cases, sensor response time is impacted by fluid residence time, which can vary in a wide range of 5-1,000 ms, depending on the manifold. Accordingly, in many cases, flow control valves in accordance with aspects of the invention will be the fastest component, sometimes significantly. However, as part of the tuning process, the proportional algorithm constant may be made to slow down the reaction of the flow control valve to account for slow sensor response and other potential delays in the system, and thereby allow the sensor sufficient time to "catch up" by the time the error is close to nil. Therefore, in most embodiments, it is preferable to determine the PD parameters for the flow control valves on the actual system of interest.

To accommodate substantially slow responding systems such as systems that control the flow of liquids into actuators, the response time of the solenoid valves may be adjusted down to better match the timescale of the system, rather than for the purpose of speeding up solenoid switching. For example, the response time of solenoid 320 may be extended when screw 324 is adjusted clockwise to limit the motion of plunger 321 and reduce the flow of control fluid through inlet 323. Similarly, the response time of solenoid 330 may be extended when screw 334 is adjusted clockwise to limit the motion of plunger 331 and reduce the flow of control fluid through outlet 333.

Flow control valves 300, 500, as well as other embodiments falling within the scope of this invention, effectively prevent the generation of particles at the diaphragm/valve-seat area. This feature is due to the extremely small impact of the diaphragm against the valve seat, given the diaphragm's small mass and its decelerating spring force. Likewise, the impact of the control fluid against the diaphragm is negligible. Flow valves in accordance with aspects of the invention thereby may set new standards for stable performance and lifetime. Multiple prototypes were, for example, tested to retain their performance after $1\times10^8$ cycles at 20 Hertz (Hz) wherein, within each cycle, the control fluid was cycled between 0-100 PSIA to exert the maximum deflection and retraction of the diaphragms.

Figure 6:
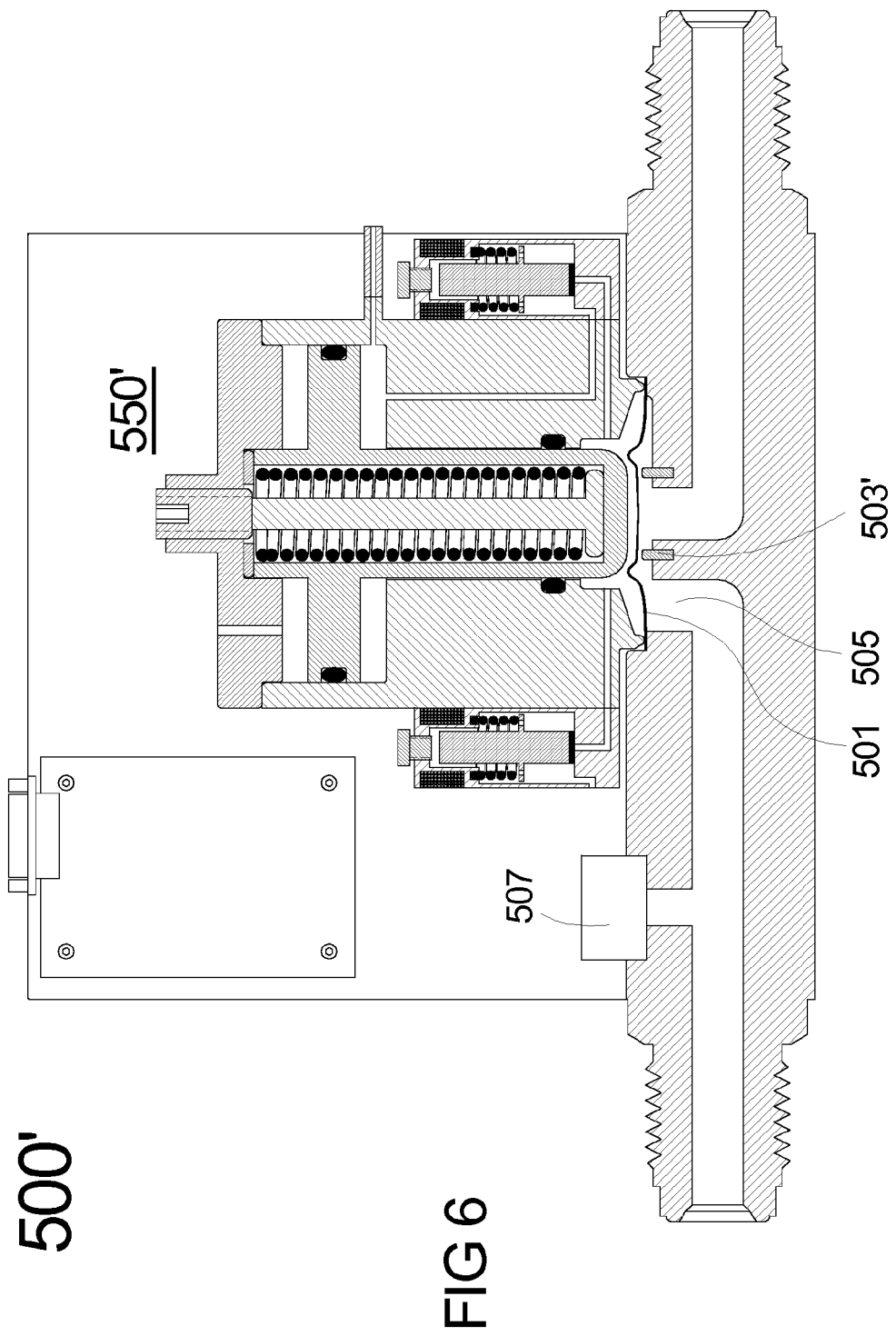
FIG. 6 shows a sectional view of a flow control valve in accordance with a third illustrative embodiment of the invention.

A similar embodiment in accordance with aspects of the invention is depicted in the sectional view in FIG. 6. As before, flow control valve 500' may be used to control flow rates when sensor 507 is a flow sensor, and used to control pressure when sensor 507 is a pressure sensor. Within the flow control valve 500', a metallic diaphragm 501 is disposed to seal the flow path between polymer valve seat 503' and fluid outlet port 505. All other components and features are similar to flow control valve 500 in FIG. 4. A prototype flow control valve similar to the flow control valve 500' demonstrated a lower leak rate than a prototype with a metal valve seat. More particularly, the prototype with the polymer valve seat demonstrated a leak rate of $<10^{-8}$ mBar×L/second with the valve shut off (i.e., control fluid pressure at inlet 512 vented), while the prototype with the metal seat demonstrated a leak rate of about $10^{-6}$ mBar×L/second. The leak rate in the flow control mode of the prototype with the polymer seat, once the shutoff stem was actuated, was $<5\times10^{-9}$ mBar×L/second when the control fluid pressure exceeded 70 PSIG. Nevertheless, ultimately, the choice for valve seat material may depend on the temperature range of operation. For example, PFA 450HP ("Teflon"; available from DuPont (Fayetteville, N.C., USA)) may be suitable for a wide range of temperatures up to 200° C. Polychlorotrifluoroethene ("Kel-F"; available from Aetna Plastics (Valley View, Ohio, USA)) may be suitable for applications below 85° C.

Flow control valves in accordance with aspects of the invention may be particularly well suited to the demands of ALD processing. Prototype flow control valves (acting as pressure controllers) similar to the flow control valve 500' were applied to control the pressure within ALD delivery manifolds. For that purpose, a 50-100 milliliter ALD supply tank was installed downstream from the flow control valves. Delivery pressure was typically controlled within the pressure range of 5-50 Torr with delivery within the flow rate range of 100-5,000 sccm. Typically, the supply tank was sized to accommodate <10%, preferably <5%, of gas draw during an ALD pulse. For example, a 75 milliliter tank was used for a 10 Torr controlled reactive gas that was pulsed for 10 ms at about 250 sccm each cycle, resulting in <4.3% draw. With PD parameters tuned in the linear range of >200 sccm flow rate and >300 Torr inlet pressure, response time of <25 ms was achieved for flow rates in the linear portion of the flow dependence on control fluid pressure. Applying these PD parameters, response times of less than 100 ms were achieved for flow rates in the 0-200 sccm range, as well as for inlet pressures in the 5-300 Torr range. Accordingly, flow control valves in accordance with aspects of the invention were demonstrated to accommodate the entire wide range of ALD delivery specifications, with one part number, and without gain scheduling. At the same time, the integrated shutoff valve provided fail safety for interlocking the delivery of highly reactive ALD precursors against loss of power or control fluid pressure (in this case, air pressure), as well as multiple other potentially hazardous situations.

Figure 7:
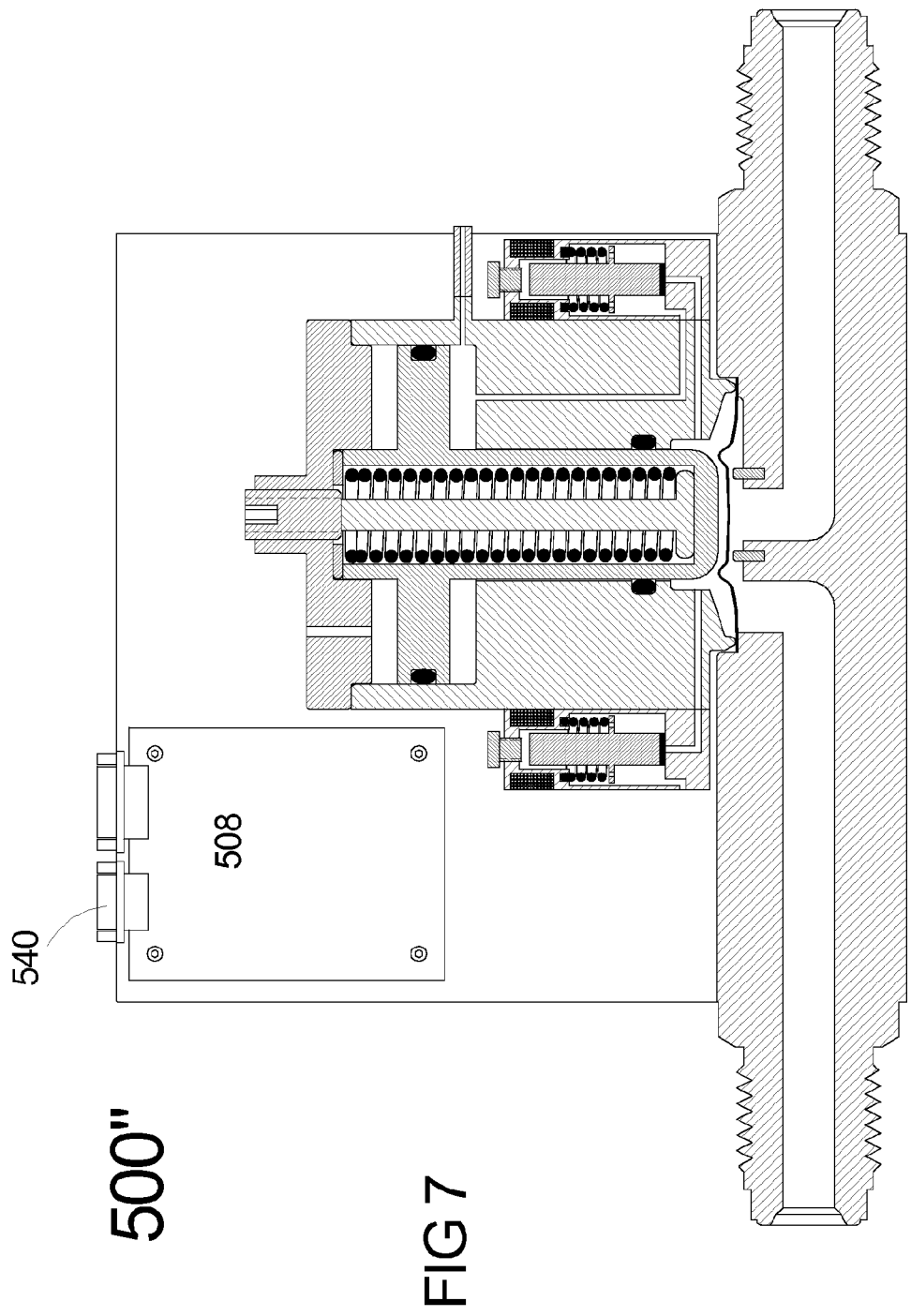
FIG. 7 shows a sectional view of a flow control valve in accordance with a fourth illustrative embodiment of the invention.

Another illustrative embodiment depicted in FIG. 7 comprises a failsafe polymer seat flow control and shutoff valve 500". However, instead of utilizing a local pressure sensor in the manner of flow control valves 500, 500', flow control valve 500" is instead configured to control pressure in response to one or more remotely-installed pressure sensors. Flow control valve 500" therefore includes sensor input connector 540, which may communicate with the remote pressure sensors via cables (not shown). Such remote sensing capabilities may be suitable for applications such as controlling the pressure of an inert gas that protect fragile heaters disposed inside a heating chuck wherein heater-to-chuck contact and/or complete sealing of the heaters inside the chuck are not possible. For that application, flow control valve 500" may quickly react to adjust to maintain the pressure at set value independent of time varying flow out of the chuck. Of course, in alternative embodiments, remotely-installed flow sensors may be utilized in a similar manner to regulate downstream flow rates rather than pressure.

In another exemplary application in accordance with aspects of the invention, a manifold comprising two flow control valves 500", two remotely installed flow sensors (interfaced with the two flow control valves via their sensor input connectors 540), and two shutoff valves provides directional and speed control to a hydraulic actuator. The manifold connects the first flow control valve 500" and the second shutoff valve to one side of the actuator, and connects the second flow control valve 500" and the first shutoff valve to the second side of the actuator. The hydraulic actuator can move in two opposite directions. Speed controlled motion in the first direction actuates the shutoff valve of first flow control valve 500" and provides a flow rate set point to the flow control valve. At the same time the first shutoff valve is actuated open. As a result, flow controlled fluid is applied to propel the actuator with a well-defined speed while the fluid is drained from the other side of the actuator via the first shutoff valve. The speed of the actuator is precisely related to the flow rate. Alternatively, flow control valves 500" can directly control the linear speed of the actuator when the flow sensors are substituted with linear speed sensors. To stop the motion, the hydraulic actuator is "braked" by a simultaneous shutoff of both first flow control valve 500" and first shutoff valve, to halt the flow instantaneously. To move in the second direction, the shutoff valve of second flow control valve 500" is actuated and a flow rate set point is provided to the flow control valve. At the same time the second shutoff valve is actuated open. As a result, flow controlled fluid is applied to propel the actuator with a well-defined speed while the fluid is drained from the other side of the actuator via the second shutoff valve. In this particular application, the fast response and wide range of flow control valves 500", as well as the integrated shutoff valves, provide fast and accurate motion control to hydraulic systems for improved processing, stamping, parts handling, robotic motion, and the like.

Figure 8:
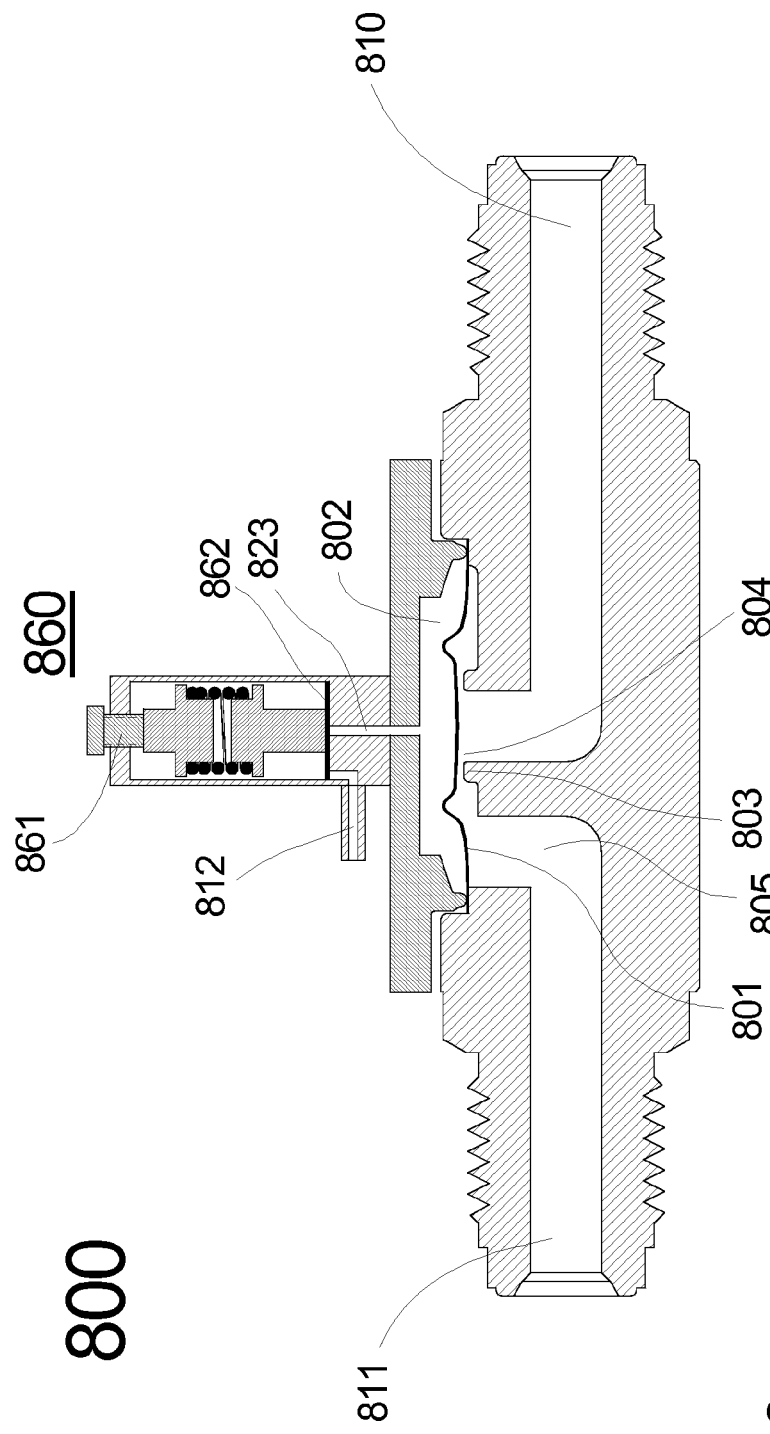
FIG. 8 shows a sectional view of a flow control valve in accordance with a fifth illustrative embodiment of the invention.

FIG. 8 shows a sectional view of a flow control valve 800 in accordance with a fifth illustrative embodiment of the invention. In this flow control valve 800, metallic diaphragm 801 is disposed to seal the flow path between valve seat 803 and fluid outlet port 805. Orifice 804 is formed between diaphragm 801 and valve seat 803. A sealed diaphragm control space 802 is formed above diaphragm 801. The diaphragm control space comprises control fluid inlet 823. The flow control valve 800 also includes inlet fitting 810, outlet fitting 811, and control fluid inlet 812.

In contrast to the several flow control valves discussed above, the flow control valve 800 utilizes a pressure regulator 860 as opposed to solenoids to regulate control fluid pressure in diaphragm control space 802. In use, control fluid (e.g., compressed air) from inlet 812 is fed into pressure regulator 860. Pressure regulator 860, in turn, is manually adjusted via knob 861 to deliver control fluid at regulated pressure past sensing diaphragm 862 and into diaphragm control space 802 via flow path 823. The pressure regulated control fluid inserted into control space 802 deflects the diaphragm 801 and thereby defines the orifice 804, which, for a stable temperature and inlet pressure, establishes the flow rate. Unlike conventional manual "needle valve" flow control valves, flow control valve 800 provides for a wide range of flow rate adjustment with improved sensitivity at low flow rates, no generation of particles, and long service life. In addition, unlike conventional mechanical needle valves, flow control valve 800 can be reproducibly switched between a precise orifice and a fully open, high flow path by virtue of ON/OFF switching the control fluid at inlet 812.

Figure 9:
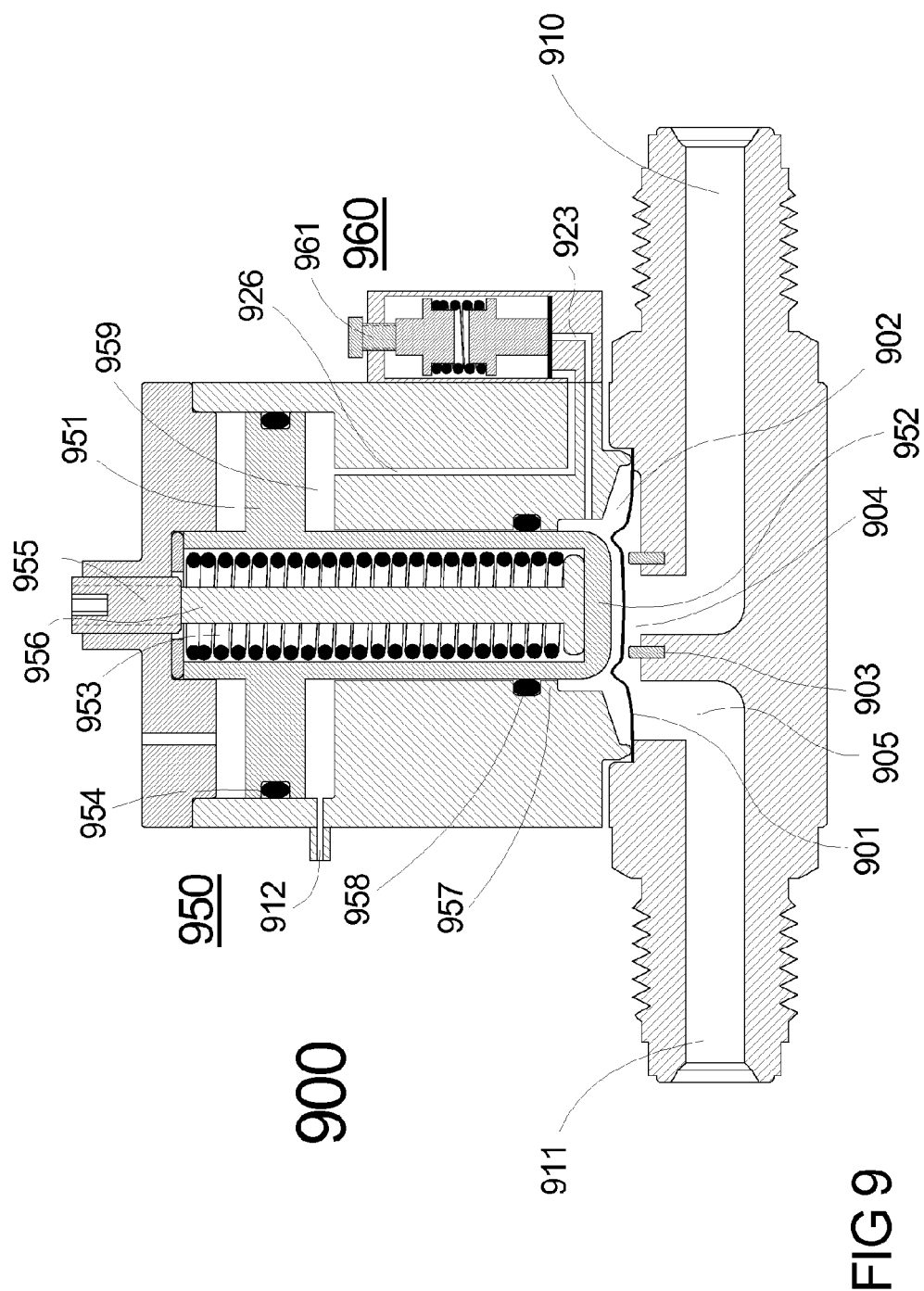
FIG. 9 shows a sectional view of a flow control valve in accordance with a sixth illustrative embodiment of the invention.

A further improvement in accordance with aspects of the invention is further depicted in the sectional view in FIG. 9, which shows an illustrative manual flow control valve 900 comprising a failsafe shutoff valve 950. In this particular, non-limiting embodiment, metallic diaphragm 901 is disposed to seal the flow path between valve seat 903 and fluid outlet port 905. Valve seat 903 comprises a polymer seal. Orifice 904 is formed between diaphragm 901 and seat 903. A sealed diaphragm control space 902 is formed above diaphragm 901. Diaphragm control space 902 comprises controlling fluid inlet 923. The flow control valve 900 also includes inlet fitting 910, outlet fitting 911, control fluid inlet 912 and pressure regulator 960.

Flow control valve 900 comprises shutoff valve 950 to provide failsafe shutoff of diaphragm 901 via stem 952. Stem 952 can slide into control space 902 via opening 957 while seal 958 maintains the overall fluid tightness of diaphragm control space 902. Stem 952 is biased by the force of spring 953 towards the diaphragm 901. The shutoff valve 950 is opened when pressurized control fluid (e.g., compressed air) is injected into actuator space 959 to actuate piston 951. Piston 951 is equipped with sliding seal 954. Once shutoff valve 950 is actuated open, control fluid (e.g., compressed air) from actuator space 959 feeds into pressure regulator 960 via inlet 926, where the control fluid is available for the flow control valve 900. The retraction of stem 952 may be adjusted to the minimum needed to allow diaphragm 901 a full range of motion by plunger 956, as set by adjustment screw 955. That limited motion is preferred for minimizing the acceleration of stem 952 and the consequent impact when stem 952 impacts diaphragm 901 against valve seat 903. This impact may be further reduced by restricting the vent of control fluid out of actuator space 959 when the control fluid supply at inlet 912 is deactivated. In actual reduction to practice, both measures were found very effective in preventing the generation of particles by the shutoff mechanism.

The control fluid from inlet 926 is fed into pressure regulator 960. Pressure regulator 960 may be manually adjusted via knob 961 to deliver control fluid at regulated pressure into diaphragm control space 902 via flow path 923. The pressure-regulated control fluid injected into diaphragm control space 902 defines the orifice 904, which for a given temperature and inlet pressure, defines the flow rate. Here again, in contrast to conventional manual "needle valve" flow control valves, flow control valve 900 provides for a wide range of flow rate adjustment with improved sensitivity at low flow rates, no generation of particles, and long service life. With the added integrated failsafe shutoff valve 950, flow control valve 900 further provides a single component substitute to commonly used two-component shutoff-valve/needle-valve combinations.

Flow control valves in accordance with embodiments of the invention may also be implemented with integrated high speed flow measurement sensors. FIGS. 10a and 10b show such a flow control valve 1000, with FIG. 10a showing a perspective view of the flow control valve 1000 with a sidewall removed and FIG. 10b showing a sectional view. The flow control valve 1000 shares many elements with the flow control valve 500' in FIG. 6, and these elements are labeled with like reference numerals. At the same time, the flow control valve 1000 includes an integrated high speed flow measurement sensor comprising an upstream pressure sensor 507', a downstream pressure sensor 507", and an orifice 560. These additional elements are located between the fluid outlet port 505 and the outlet fitting 511. The orifice 560 is of a given size to provide a calibrated flow rate. The pressure sensors 507', 507" measure pressure on opposite sides of the orifice 560. More particularly, the upstream pressure sensor 507' is operative to measure pressure at a first space in the flow control valve 1000, while the downstream pressures sensor 507" is operative to measure pressure at a second space. The second space is in fluidic communication with the first space through the orifice 560.

In a working prototype flow control valve matching that shown in FIGS. 10a and 10b, the high speed flow measurement sensor was implemented with two model 85-005A-0C pressure sensors from Measurement Specialties (Hampton Va., USA). These pressures sensors had <1 msec response times, and faithfully reflected the pulsed flow modulation during ALD processing. The prototype was utilized to precisely control the delivery of precursors during ALD processing by maintaining the integrated value of each pulse at set-point. For that purpose, the flow was integrated at a set interval, typically in the range of 2-5 msec, from zero-flow, to the next zero flow. This feature enhanced the precision of precursor-delivery during the ALD processing that, in turn, improved the efficiency of the process. In addition, it enabled real time monitoring of downstream ALD valves and components.

The added ability to monitor downstream ALD valves and components is a result of the fact that the pressure of the downstream pressure sensor 507" is related to the delivery of precursor, which is being controlled by that pressure, as well as by the conductance of the downstream ALD valve and manifold. An increase of this pressure during processing may therefore indicate that the conductance of the ALD valve is declining due to potential problems of malfunctioning, clogging, manifold temperature increase, etc. Likewise, a decrease of that pressure during processing may indicate that the manifold temperature may be coming down, or it could indicate that the ALD manifold has developed a leak. This ability to gain an early warning for potential malfunctions, enables, for the first time, real time monitoring of the performance of an often complicated collection of pulsed valves with the ability to use this monitoring for early detection of problems. Such early detection of problems is crucial for the ability to maintain production ALD equipment at ultimate performance to ensure high yield manufacturing.

In closing, it should again be emphasized that the above-described embodiments of the invention are intended to be illustrative only. Other embodiments can use different types and arrangements of elements for implementing the described functionality. These numerous alternative embodiments within the scope of the invention will be apparent to one skilled in the art.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for controlling a flow of a fluid therethrough while the apparatus is connected to a source of control fluid, the apparatus comprising:
   an input;
   a valve seat;
   a diaphragm formed of metal;
   an output;
   a diaphragm control space, the diaphragm control space partially defined by the diaphragm and comprising a control fluid inlet and a control fluid outlet;
   a control fluid feed valve, the control fluid feed valve operative to regulate the flow of control fluid into the diaphragm control space;
   a stem, the stem operative to slide towards and away from the diaphragm;
   a spring, the spring applying a spring bias force against the stem towards the diaphragm; and
   a stem control space, the stem control space operative to receive control fluid from the source of control fluid;
   wherein the apparatus is operative to independently control a flow of control fluid into the diaphragm control space through the control fluid inlet and a flow of control fluid out of the diaphragm control space through the control fluid outlet;
   wherein a deflection of the diaphragm in relation to the valve seat is responsive to a pressure of control fluid in the diaphragm control space;
   wherein the deflection of the diaphragm in relation to the valve seat is operative to control a fluidic flow resistance between the input and the output;
   wherein a pressure of control fluid in the stem control space urges the stem in a direction opposite to the spring bias force.

2. The apparatus of claim 1, wherein the stem control space is in serial fluidic communication with the control fluid feed valve, and the control fluid feed valve is in serial fluidic communication with the diaphragm control space.

3. The apparatus of claim 1, wherein the stem passes through a wall of the diaphragm control space.

4. The apparatus of claim 1, wherein the control fluid feed valve comprises a pressure regulator.

5. The apparatus of claim 1, further comprising a control fluid relief valve, the control fluid relief valve operative to regulate the flow of control fluid out of the diaphragm control space.

6. The apparatus of claim 5, wherein the control fluid feed valve comprises a solenoid valve.

7. The apparatus of claim 5, wherein the control fluid relief valve comprises a solenoid valve.

8. The apparatus of claim 5, further comprising a controller, the controller operative to actuate the control fluid feed valve and the control fluid relief valve.

9. The apparatus of claim 8, further comprising a sensor, the sensor in data communication with the controller.

10. The apparatus of claim 9, wherein the sensor is operative to measure at least one of flow and pressure.

11. The apparatus of claim 9, wherein the controller is operative to actuate the control fluid feed valve and the control fluid relief valve at least in part based on data received from the sensor.

12. The apparatus of claim 11, wherein the controller is operative to actuate the control fluid feed valve and the control fluid relief valve at least in part based on data received from the sensor so as to achieve a sensor set point on the sensor.

13. The apparatus of claim 8, wherein the controller is operative to actuate the control fluid feed valve and the control fluid relief valve at least in part based on data received from a sensor, the sensor being distinct from the apparatus and being operative to measure at least one of flow and pressure.

14. The apparatus of claim 1, wherein the valve seat comprises a metal or a polymer.

15. The apparatus of claim 1, wherein the control fluid comprises a gas or a liquid.

16. The apparatus of claim 1, further comprising:
an upstream pressure sensor, the upstream pressure sensor operative to measure pressure at a first space in the apparatus;
a downstream pressure sensor, the downstream pressures sensor operative to measure pressure at a second space in the apparatus; and
an orifice;
wherein the second space is in fluidic communication with the first space through the orifice.

17. A method of controlling a flow of a fluid comprising the steps of:
providing an input:
providing a valve seat;
providing a diaphragm formed of metal;
providing an output;
providing a diaphragm control space, the diaphragm control space partially defined by the diaphragm and comprising a control fluid inlet and a control fluid outlet;
providing a control fluid feed valve, the control fluid feed valve operative to regulate the flow of control fluid into the diaphragm control space;
providing a stem, the stem operative to slide towards and away from the diaphragm;
providing a spring, the spring applying a spring bias force against the stem towards the diaphragm; and
providing a stem control space, the stem control space operative to receive control fluid from a source of control fluid; and
independently controlling a flow of control fluid into the diaphragm control space through the control fluid inlet and a flow of control fluid out of the diaphragm control space through the control fluid outlet;
wherein a deflection of the diaphragm in relation to the valve seat is responsive to a pressure of control fluid in the diaphragm control space;
wherein the deflection of the diaphragm in relation to the valve seat is operative to control a fluidic flow resistance between the input and the output;
wherein a pressure of control fluid in the stem control space urges the stem in a direction opposite to the spring bias force.

* * * * *